No. 668,082. Patented Feb. 12, 1901.
A. D. BLOCH.
VEHICLE AXLE BEARING.
(Application filed Nov. 20, 1900.)
(No Model.)

Witnesses
Robert Everett

Inventor
Adolph D. Bloch.
By James L. Norris,
Atty.

UNITED STATES PATENT OFFICE.

ADOLPH D. BLOCH, OF MOBILE, ALABAMA.

VEHICLE-AXLE BEARING.

SPECIFICATION forming part of Letters Patent No. 668,082, dated February 12, 1901.

Application filed November 20, 1900. Serial No. 37,146. (No model.)

*To all whom it may concern:*

Be it known that I, ADOLPH D. BLOCH, a citizen of the United States, residing at Mobile, in the county of Mobile and State of Alabama, have invented new and useful Improvements in Vehicle-Axle Bearings, of which the following is a specification.

This invention relates to vehicle-axle bearings, and is in the nature of an improvement on the axle-bearing for which I obtained Letters Patent of the United States on the 10th day of April, 1900, No. 647,368.

The present invention has for its objects to increase the strength and effect an economy in the manufacture of the bearing and to improve and simplify the same generally.

To these ends my invention consists in the features and in the construction and combination of parts hereinafter described, and particularly pointed out in the claims following the description, reference being had to the accompanying drawings, forming a part of this specification, wherein—

Figure 1:
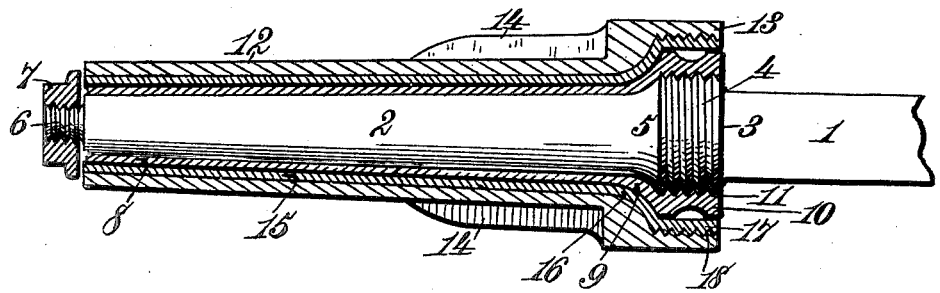
Figure 2:
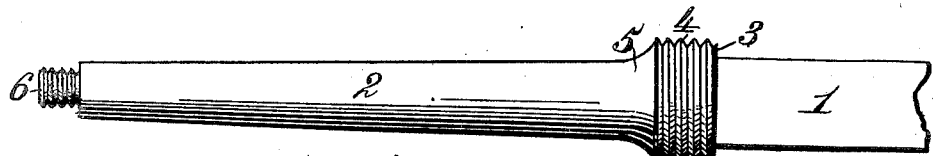
Figure 3:
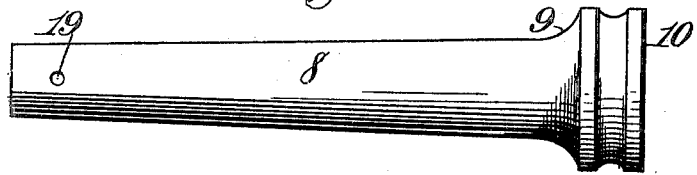
Figure 4:
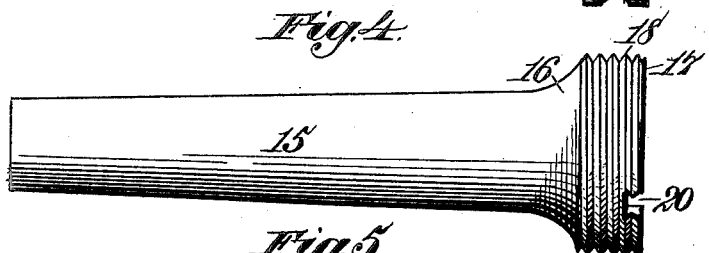
Figure 5:
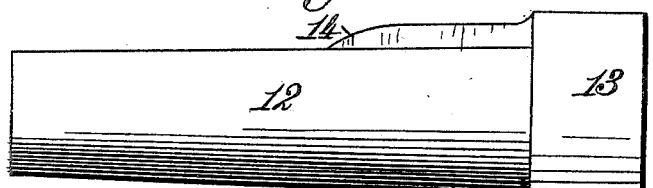

Figure 1 is a central longitudinal sectional view of my improved bearing, the parts being shown assembled together in operative position. Fig. 2 is a detail view of the axle-spindle. Fig. 3 is a similar view of the sleeve. Fig. 4 is a similar view of the bushing, and Fig. 5 is a similar view of the axle-box.

Referring to the drawings, the numeral 1 indicates a metallic axle reduced at its end to form a spindle 2. As shown, the spindle is tapered throughout—that is to say, it gradually diminishes in diameter from its inner toward its outer end. The end of the axle next adjacent to the spindle is formed with an annular collar 3, which is threaded on its periphery, as at 4. The outer end of the collar instead of terminating abruptly or at a right angle to the spindle, as shown in my said patent, gradually merges into the spindle, or, in other words, the inner end of the spindle is formed with a concave conical enlargement 5 intermediate the collar 3 and the uniformly-tapered portion of the spindle. This is for the purpose of adding strength to the spindle, and the latter is not so apt to break off at this point as is the spindle constructed in the manner illustrated in my patent before referred to. The extreme outer end of the spindle is reduced and threaded, as at 6, to receive an axle-nut 7, as usual.

The numeral 8 indicates a sleeve consisting of a relatively thin tubular shell of approximately the same length as the spindle 2 and tapered from end to end to correspond with the tapered form of said spindle. The inner end of the sleeve is formed with a concavo-convex conical enlargement 9, which terminates in an annular flange 10, interiorly screw-threaded, as at 11. The interior of the sleeve 8 corresponds in shape to the exterior of the spindle 2, and the annular flange screws over the collar 3, the arrangement being such that when the two are connected together the sleeve snugly, closely, and accurately fits the spindle at every point, the two forming practically a solid spindle. As shown, the exterior of the spindle and both the interior and exterior of the sleeve are perfectly smooth.

Adapted to be inserted in an ordinary wheel-hub is an axle-box consisting of a cylindrical shell 12, having formed on its inner end a cylindrical enlargement or annular flange 13. On the periphery of the inner end of the box are formed longitudinal ribs or feathers 14, as usual, which when the box is driven into the hub tightly hold the box against turning in the hub. Adapted to be inserted in the box is a bushing comprising a tapered tubular shell 15, having formed on its inner end a concavo-convex conical enlargement 16, that terminates in a cylindrical enlargement or annular flange 17, screw-threaded exteriorly, as at 18. The interior of the bushing 15 corresponds in shape to the exterior of the sleeve 8, on which it is adapted to be rotatably fitted, and the interior of the box is shaped to conform to the exterior of the bushing, the two being firmly secured together by screwing the flange or cylindrical enlargement 18 into the corresponding flange or enlargement 13 of the axle-box, which is internally threaded for the purpose. The sleeve 8 has a hole 19 formed in its periphery for the reception of the end of a spanner, by means of which the sleeve may be screwed on and off the spindle, and the flange 17 of the bushing has formed in its end two nicks or recesses 20 for the same purpose. Both the interior and exterior of the bushing are finished off true and smooth to fit the exterior of the sleeve and the interior of the axle-box.

After all the parts have been assembled together in the manner above described it is only necessary to slip the bushing upon the sleeve and then screw a nut 21 over the reduced and threaded end 6 of the spindle to secure the wheel in place on the axle.

It will be evident that all the friction and wear will be on the sleeve and bushing, there being none whatever on either the spindle or the box. Hence the latter will last indefinitely and will need no renewing or repairing, and the spindle and box may therefore, if preferred, be made of cast-iron and the sleeve and bushing of steel. When the sleeve and bushing become worn and unfit or undesirable for further use, it is only necessary to remove the vehicle-wheel from the axle, then unscrew the sleeve from the spindle and the bushing from the box, and screw in their place a new sleeve and bushing. As the spindle and sleeve and the box and lining are perfectly smooth, the annular flanges or cylindrical enlargements only being threaded, the parts may be unscrewed and screwed together again with ease and despatch, the entire operation requiring but a few minutes of time and no skilled labor.

In practice the screw-threads should be formed right-handed, so as to keep the parts screwed up to their places when in use on a vehicle. It will be manifest that the sleeve and bushing, as well as the axle and box, can be made of any desired length, size, shape, and pitch and can be made with single or double collars. The invention can also be applied to any make of axle.

Having described my invention, what I claim is—

1. The combination with an axle-spindle provided at its inner end with an integral annular collar screw-threaded upon its periphery, said spindle being tapered and smooth upon its periphery and provided at its inner end intermediate its uniformly-tapered portion and said collar with a concave conical enlargement, of an axle-sleeve provided at its inner end with a cylindrical and interiorly-threaded enlargement screwed over the said threaded collar, said sleeve having a smooth tapered interior and exterior and shaped to accurately fit the spindle, substantially as described.

2. The combination with an axle-box having an interiorly-threaded cylindrical enlargement at one end and provided externally with means for securing the box in a hub, said box having a smooth tapered interior of a tapered bushing provided with an exteriorly-threaded cylindrical enlargement at its inner end, said bushing being finished smooth on both its interior and exterior and provided at its inner end intermediate its uniformly-tapered portion and the said cylindrical enlargement with a concavo-convex conical enlargement, said bushing and box being secured together by the said threaded cylindrical enlargement, substantially as described.

In testimony whereof I have hereunto set my hand in presence of two subscribing witnesses.

ADOLPH D. BLOCH.

Witnesses:
OSCAR K. HEWITT,
W. H. ANDREWS, Jr.